S. F. MIOTON.
FLUID MEASURING DEVICE.
APPLICATION FILED MAY 1, 1917.

1,288,113.

Patented Dec. 17, 1918.
4 SHEETS—SHEET 1.

WITNESSES

INVENTOR
Sidney F. Mioton
BY
ATTORNEYS

S. F. MIOTON.
FLUID MEASURING DEVICE.
APPLICATION FILED MAY 1, 1917.

1,288,113.

Patented Dec. 17, 1918.
4 SHEETS—SHEET 2.

WITNESSES
Frederick Diehl.

INVENTOR
Sidney F. Mioton
BY
ATTORNEYS

S. F. MIOTON.
FLUID MEASURING DEVICE.
APPLICATION FILED MAY 1, 1917.

1,288,113.

Patented Dec. 17, 1918.
4 SHEETS—SHEET 3.

WITNESSES
Frederick Wiehl.
E. M. Marshall

INVENTOR
Sidney F. Mioton
BY
Munn & Co.
ATTORNEYS

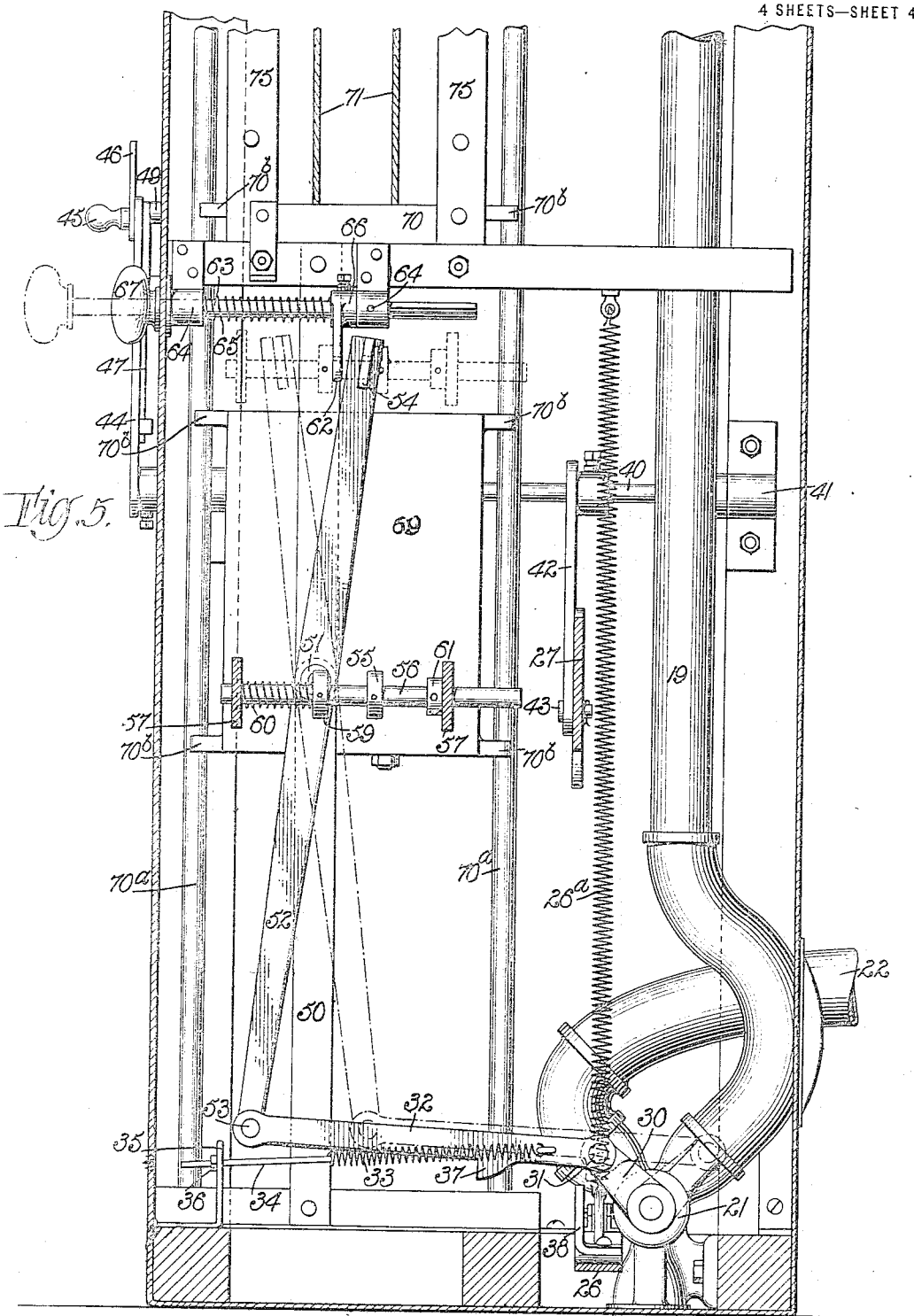

UNITED STATES PATENT OFFICE.

SIDNEY FITZHUGH MIOTON, OF NEW ORLEANS, LOUISIANA.

FLUID-MEASURING DEVICE.

1,288,113.  Specification of Letters Patent.  Patented Dec. 17, 1918.

Application filed May 1, 1917. Serial No. 165,712.

*To all whom it may concern:*

Be it known that I, SIDNEY F. MIOTON, a citizen of the United States, and a resident of New Orleans, in the parish of Orleans and State of Louisiana, have invented a new and Improved Fluid-Measuring Device, of which the following is a full, clear, and exact description.

My invention has for its object to provide a fluid measuring device having a measure into which a fluid may flow through a valve, adjustable means being provided for actuating the valve when any one of a plurality of quantities of the fluid has flowed into the measure.

Another object of the invention is to provide a cylinder movable relatively to a piston disposed therein, the adjustable means being engaged by the movement of the cylinder relatively to the piston to free means which hold against the action of resilient means, the valve directing the fluid to the cylinder. The said valve is of the three-way type, and when the valve is freed and is moved by the resilient means, it directs the fluid from the cylinder to an outlet.

Still other objects of the invention are to provide a fluid measuring device having a valve which cannot be closed until the amount of fluid for which the measuring device has been set has been measured, and to provide locking means for counterweights for the cylinder, which are freed by the movement of the valve operating means.

Additional objects of the invention will appear in the following specification, in which the preferred form of the invention is disclosed.

In the drawings similar reference characters denote similar parts in all the views, in which—

Fig. 5 is an enlarged fragmentary sectional view illustrating the means for operating the valve.

Figure 1:
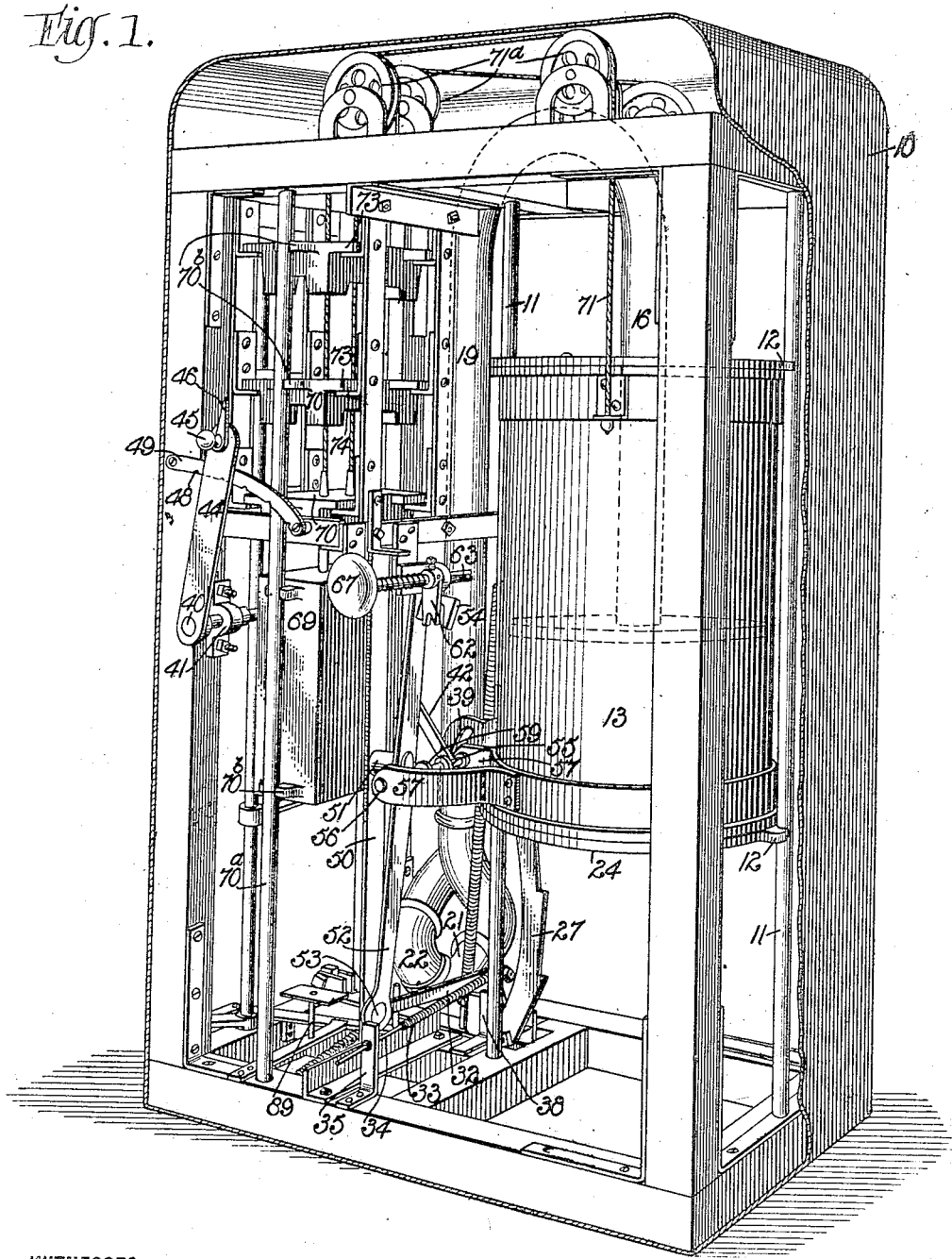
Figure 1 is a perspective view of the invention, the casing being broken away to illustrate the construction and arrangement of the parts.
Figure 2:
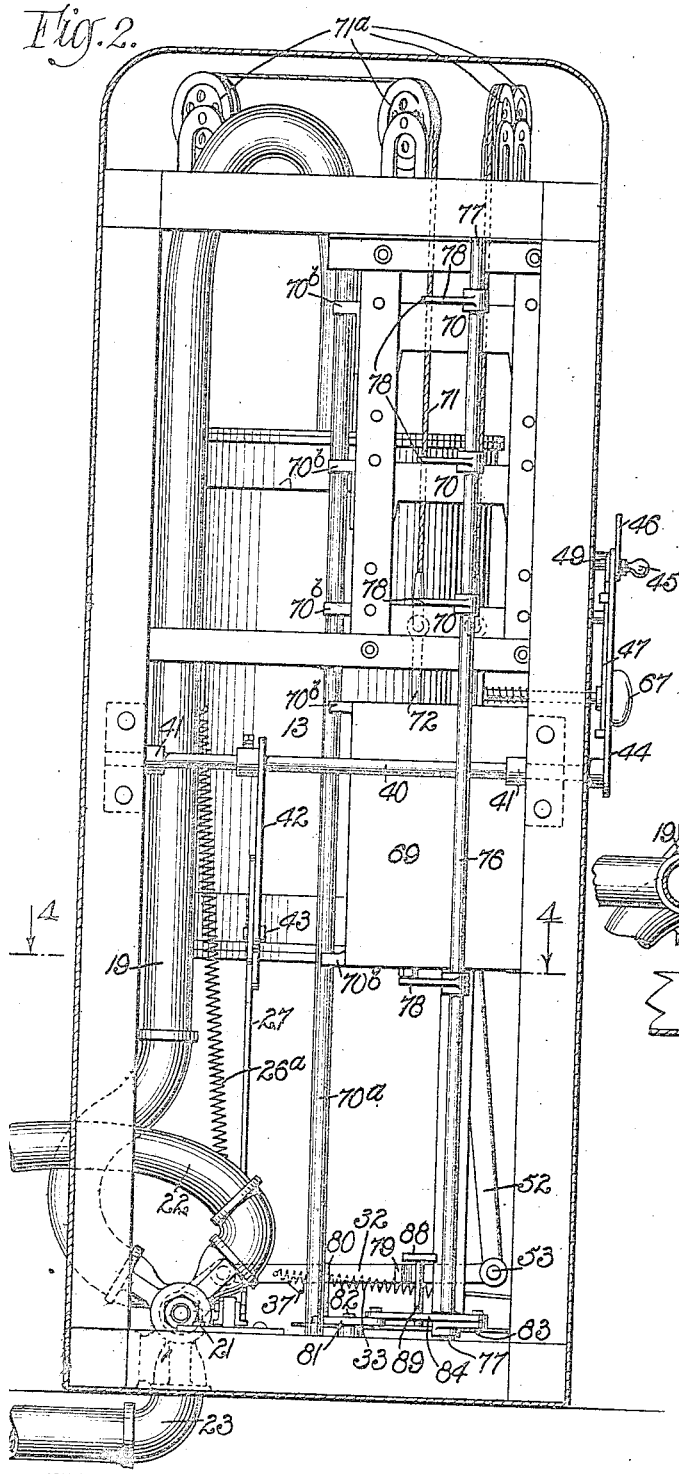
Fig. 2 is a side elevation of the invention, the casing being illustrated in section.
Figure 4:
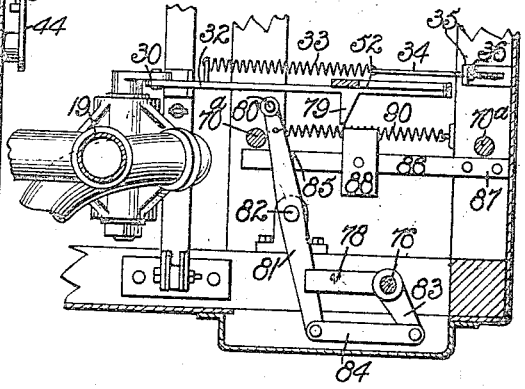
Fig. 4 is a sectional view on the line 4—4 of Fig. 2.

By referring to the drawings, it will be seen that disposed within a casing 10 there are guide rods 11 with which engage lateral guides 12 projecting from a measuring cylinder 13. Disposed in the said measuring cylinder 13 there is a piston 14 provided with an opening, the terminal 15 of a short leg 16 of a siphon 17 being secured to the piston 14 around its opening. The terminal 18 of the long leg 19 of the said siphon 17 is connected with a port 20 of a three-way valve 21. The said three-way valve 21 has another port to which leads a pipe 22 which is connected with a fluid supply not shown, the third port of the three-way valve 21, which leads to an outlet pipe, being shown at 23. It will be understood that with this construction it is possible to connect the pipe 22 with the pipe 18 through the three-way valve 21 to permit a fluid to flow through the siphon 17 into the cylinder 13 between the cylinder head 24 and the piston 14. It will also be understood that when the three-way valve 21 is operated to disconnect the pipe 22 from the pipe 18, and to connect the pipe 18 with the outlet port 23, the fluid contained in the cylinder 13 will be siphoned from the cylinder, as the short leg 16 of the siphon is connected with the piston 14, and the long leg 19 of the siphon is connected with the three-way valve. Counterweights which will shortly be described are secured to the cylinder 13 to assist in raising the cylinder.

Inasmuch as a demand may be made for a quantity of fluid less than that which is contained within the cylinder 13 when the cylinder 13 is filled, I provide means which I will now describe for operating the three-way valve 21 when a predetermined quantity of the fluid has passed into the cylinder. Articulated at 25 to an arm 26, there is a member 27, the arm 26 being articulated at 28 to the frame, and the member 27 being provided with a plurality of teeth 29 so that the member 27 may be moved as desired to dispose one of the teeth 29 in the path of the measuring cylinder 13. The arm 26 is held yieldingly upward by means of a spring 26ª. The said teeth 29 are disposed at different distances from the uppermost position of the cylinder, the uppermost tooth 29 on the member 27 when it is disposed in the path of the cylinder permitting the cylinder to descend only a slight distance before the said tooth is engaged by the cylinder, while the other teeth 29, which are positioned on the member 27 below the said uppermost tooth 29, will permit the cylinder to descend a greater distance when one of them is disposed in the path of the cylinder. The three-way valve has an operating arm 30, and articulated to this operating arm 30 at 31 there is a link 32, a spring 33 connecting the link 32 with a bolt 34 disposed through an orifice in a plate 35, a nut 36 meshing with a thread on the bolt 34 for securing the bolt 34 relatively to the plate 35 in adjusted position to regulate the tension of the spring 33. This spring 33 serves to hold the three-way valve 21 with the long siphon-leg 19 leading to the outlet port 23.

Depending from the link 32, there is a cam 37 which is engaged by a lug 38 on the arm 26 when the link 32 is moved rearwardly to operate the valve 21 to connect the pipe 22 with the long leg 19 of the siphon 17. This means is provided to lock the valve 21 when it has once been operated to connect the pipe 22 with the siphon, until a sufficient amount of fluid has passed into the cylinder 13 to move the cylinder down into engagement with a predetermined tooth 29 on the member 27, this downward movement of the cylinder 13 moving the member 27 downward, by which means the arm 26 with its lug 38 is moved down to free the cam 37 and permit the link 32 to move forward under the action of the spring 33.

The member 27 is provided with a slot 39 which is eccentric with a shaft 40 journaled in bearings 41 in the frame, an arm 42 being secured to the said shaft 41 and having a stud 43 disposed in the slot 39, so that a rotary movement of the shaft 40 will move the stud 43 in the slot 39 to move the member 27 so that a predetermined tooth 29 will be disposed in the path of the cylinder 13 to be engaged thereby. There is also secured to the shaft 40 a pointer 44 having a knob 45 and a finger 46, there being disposed at the rear of the pointer 44 a spring-pressed tooth 47 for engaging notches 48 in a curved bar 49. The connection of the pointer 44 with the member 27 is such that there is a predetermined ratio between the movement of the member 27 relatively to the movement of the pointer 44 to move the member 27 to dispose one of its teeth 29 in the path of the cylinder 13, which bears a fixed relation to the pointer 44 when it is disposed with its spring-pressed tooth 47 at a predetermined notch 48. When the pointer 44 is moved from zero to the first notch 48, the connection between the pointer and the member 27 will move the member 27 so that its uppermost tooth 29 will be disposed in the path of the cylinder 13; and when the pointer 44 is moved to a position where its tooth 47 will engage the bar 49 at the second notch 48 therein, the connecting means will move the member 27 so that the next to the uppermost tooth 29 thereon will be in the path of the cylinder 13. In this way may be regulated the amount of fluid which will flow into the cylinder 13 before the three-way valve 21 will be moved to connect the long leg 19 of the siphon with the outlet 23.

Fulcrumed to a frame member 50 at 51 there is a lever 52 one arm of which is articulated to the link 32 at 53, the other arm of the lever 52 having a lug 54 for engagement by a collar 55 secured to a shaft 56. The said shaft 56 is journaled in bearings 57 which project from a band 58 on the measuring cylinder 13. The said shaft 56 is movable longitudinally in its bearings 57, and is provided with a second collar 59 which is spaced from its collar 55. A spring 60 on the shaft 56 serves to hold the shaft 56 with a stop 61 secured to the shaft 56 abutting against one of the bearings 57. When the cylinder 13 is in its uppermost position, the collar 55 engages the lug 54, as illustrated by the dotted lines in Fig. 5 of the drawings, the other collar 59 on the shaft 56 being engaged by a lug 62 which depends from an operating shaft 63. The said operating shaft 63 is journaled in bearings 64 in the frame, and is movable longitudinally of its said bearings. A spring 65 coiled on the shaft 63, which presses at one end against one of the bearings 64 and at its other end against a collar 66 from which the lug 62 depends, serves to hold the operating shaft 63 in inoperative position. When the cylinder 13 is in its uppermost position, the collars 55 and 59 will be disposed as shown by the dotted lines in Fig. 5 of the drawings, so that when the operating shaft 63 is pulled outwardly by means of its knob 67, the lug 62 which engages the collar 59 will move the shaft 56 outwardly, and the collar 55 which engages the lug 54, will operate the lever 52 to press the link 32 rearwardly, thereby operating the three-way valve 21 to connect the pipe 22 with the long siphon-leg 19, the cam 37 passing the lug 38 so that the link cannot move forwardly again until the cylinder 13 has engaged one of the teeth 29 to press the arm 26 downwardly and with it the lug 38.

Figure 3:
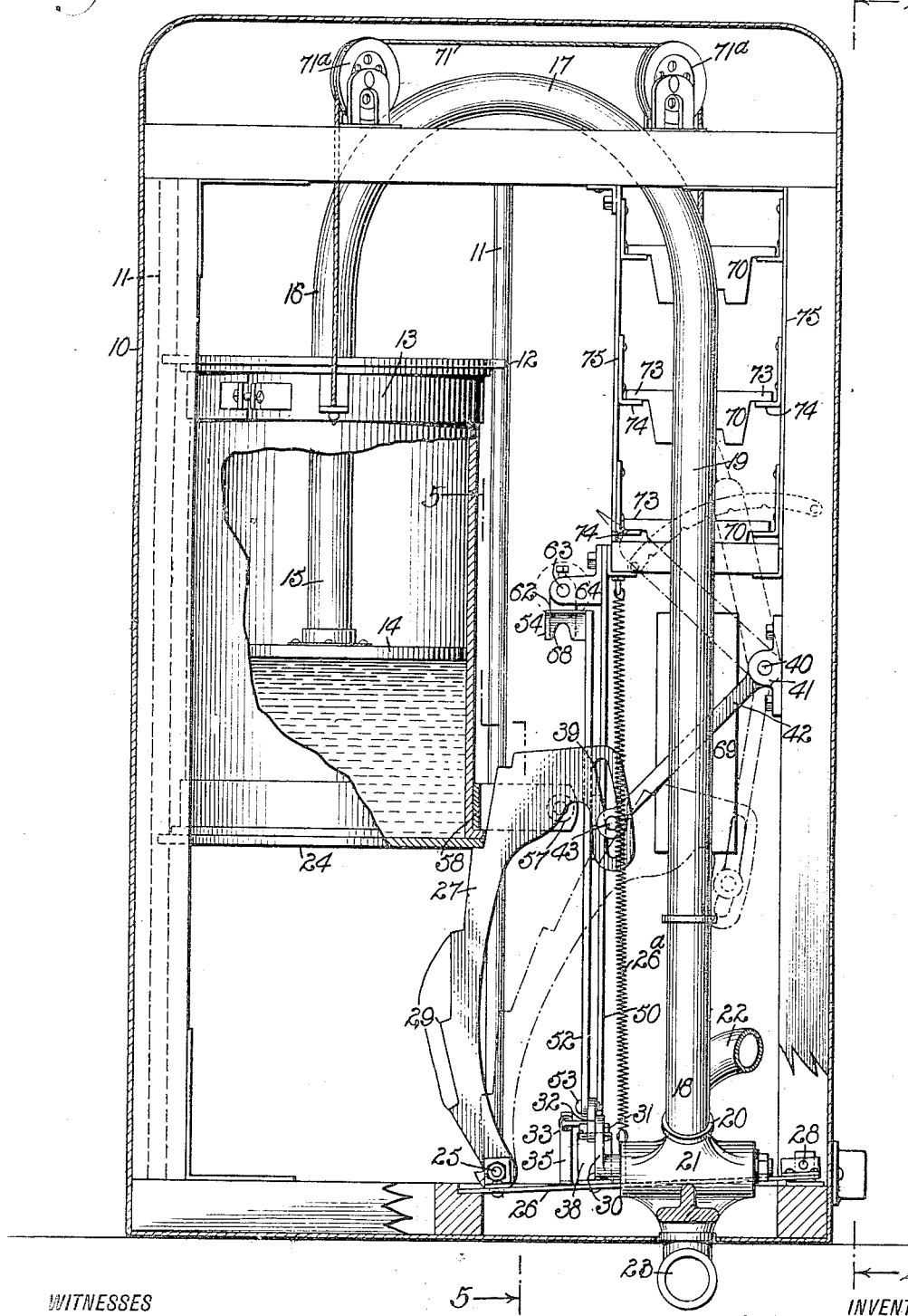
Fig. 3 is a rear sectional view of the device.

It will be understood that when the lever 52 is once operated by the means which have been described, the fluid will flow into the cylinder 13 to lower the cylinder, thereby moving the collars 55 and 59 out of engagement with the lugs 54 and 62, and that the only means to again operate the valve 21 is the spring 33 which, however, cannot operate until the lug 38 has been moved down by the member 27, in the manner which has been described. It will be understood by referring to Figs. 1 and 3 of the drawings that the lugs 54 and 62 are hollowed at their under sides at 68, so that they will fit around the shaft 56 when the measuring cylinder is moved to its uppermost position.

Counterweights are provided to assist in raising the cylinder 13 when the three-way valve 21 has been moved to connect the long siphon-leg 19 with the outlet 23. I prefer to provide a main counterweight 69 and a plurality of auxiliary counterweights 70, the main counterweight 69 being disposed below the auxiliary counterweights 70, and ropes 71 which are secured to bolts 72 projecting upwardly from the main counterweight 69, pass through openings in the said counterweights 70. The auxiliary counterweights 70 have wings 73 which normally rest on flanges 74 projecting out from a frame 75, which serve to support the auxiliary counterweights 70 spaced from each other until the main counterweight 69 has moved upwardly into engagement therewith when the main counterweight will carry the auxiliary counterweights upwardly. This construction is provided because, while the main counterweight is quite sufficient to counterbalance the cylinder 13 when only a small amount of fluid has entered the cylinder, additional counterweights may be used to advantage when a greater quantity of fluid has passed into the cylinder 13. It will be seen by the arrangement which I have described that the weight of the counterweights on the ropes 71 will depend on the distance the measuring cylinder 13 has moved under the influence of the weight of the fluid passing to the measuring cylinder. The ropes 71 are disposed over pulleys 71$^a$, suitably mounted on a frame, the ropes 71 being secured to the cylinder in a manner readily understood.

I propose to mount my measuring device on a vehicle, and in order to anchor the counterweights 69 and 70, and to prevent their upward movement under the influence of the springs of the vehicle when the vehicle is moved over rough roads, I provide a vertical shaft 76 which is journaled in bearings 77 in the frame. This shaft 76 has a plurality of arms 78 secured thereto, the said arms 78 being positioned to move with the rotation of the shaft 76 to engage the upper surfaces of the counterweights 69 and 70 and prevent any possible upward movement of the said counterweights when the counterweights are in their lowermost positions. However, it is important that the arms 78 be moved clear of the counterweights 69 and 70 immediately on the pulling outwardly of the knob 67 which operates the valve 21 in the manner described. I, therefore, provide the link 32 with a cam 79 for engaging a stud 80 on a lever 81 fulcrumed at 82 to the frame, an arm of the lever 81 being connected with an arm 83 secured to the shaft 76 by means of a link 84. This construction serves to rotate the shaft 76 and move the arms 78 out of operative position when the link 32 is moved rearwardly, since this rearward movement of the link 32 serves to bring the cam 79 into engagement with the stud 80 to operate the lever, and, by means of the link 84 and the arm 83, to rotate the shaft 76. When the lever 81 has been operated by means of the cam 79 and the stud 80, it is engaged by a stop 85 mounted on a leaf spring 86 secured to the frame at 87, which serves to hold the lever 81 in the position to which it has been moved by means of the cam 79 and the stud 80 until the main counterweight 69 descends and engages a plate 88 which is supported by a stud 89 mounted on the leaf spring 86. When the main counterweight 69 engages the plate 88 and presses the leaf spring 86 down by means of the stud 89, a spring 90 which is secured at one end to the lever 81 and at its other end to the frame, serves to return the lever 81 to primary position, which will move the arms 78 to positions where they will engage the upper surfaces of the counterweights 69 and 70. There are guides 70$^b$ on the counterweights 69 and 70 which slide on the guide rods 70$^a$.

When operating the machine, the pointer 44 is moved as may be desired with reference to the quantity of fluid which is to be measured, this movement of the pointer by the means described, moving the member 27 to the desired position. The knob 67 is then pulled outwardly which, by means of the shaft 66, the lug 62, the collars 59 and 55, the shaft 56 and the lug 54, will operate the lever 52, which in turn will operate the link 32, thereby connecting the pipe 22 with the siphon leg 18, through the valve 21. This movement of the link 32 will, by the means described, move the arms 78 out of engagement with the counterweights 69 and 70. When the pipe 22 is connected with the siphon leg 18, by means of the valve, the fluid will flow to the cylinder 13 through the siphon 17 and the weight of the fluid will cause the cylinder 13 to descend against the action of the counterweights, this downward movement of the cylinder disengaging the collars 55 and 59 from the lugs 54 and 62. When the cylinder contains the amount of fluid indicated by the position of the pointer 44, the cylinder will engage a tooth 29 on the member 27 to depress the said member, and by means of the arm 26, the lug 38 will be freed from the cam 37 on the link 32, which will permit the forward movement of the link 32, under the influence of the spring 33. The forward movement of the link 32 will operate the valve 21 to connect the siphon leg 18 with the outlet 23. When the cylinder 13 is emptied of the fluid, the counterweight 69 will engage the plate 88, which, by the means described, will return the arms 78 to operative position.

Having thus described my invention, I claim as new and desire to secure by Letters Patent:

1. In a fluid measuring device, a measuring cylindrical member having a head at one end, a piston member in the cylinder, one of the members being movable relatively to the other, a pipe having an end leading to the cylindrical member, a valve in the pipe, and means having a plurality of teeth for disposal in adjusted position in the path of the movable member to be struck thereby for controlling the valve.

2. In a fluid measuring device, a measuring cylinder having a head at its bottom, a piston in the cylinder having an opening, the cylinder being movable relatively to the piston, a pipe having an end secured to the piston around the opening, a valve in the pipe, and means for disposal in adjusted position in the path of the cylinder to be struck thereby for operating the valve.

3. In a fluid measuring device, a cylindrical member, a piston member disposed therein, one of the members being movable relatively to the other, communicating means leading to the cylindrical member, a valve in the communicating means, means having a plurality of teeth for disposal in adjusted position in the path of the movable member for movement thereby, a third member for moving the valve, and a lever articulated to the second mentioned means having means to lock the third member.

4. In a fluid measuring device, a measuring cylinder having a head at its bottom, a piston in the cylinder, the cylinder being movable relatively to the piston, a three-way valve, a pipe in the shape of a siphon and having a short leg connected with the interior of the cylinder, the long leg of the siphon being connected with the three-way valve at one of its ports, and means to operate the valve.

5. In a fluid measuring device, a measuring cylinder having a head at its bottom, a piston in the cylinder, the cylinder being movable relatively to the piston, a three-way valve, a pipe in the shape of a siphon and having a short leg connected with the interior of the cylinder, the long leg of the siphon being connected with the three-way valve at one of its ports, and means adjustably disposed in the path of the cylinder to be operated thereby for actuating the valve.

6. In a fluid measuring device, a measuring cylindrical member having a head at one end, a piston member in the cylinder, one of the members being movable relatively to the other, a pipe leading to the interior of the cylinder, a valve commanding the pipe, means to actuate the valve, a member pivoted to the means and having a plurality of teeth at different distances from the cylinder when in normal position, the member being adjustable in the path of the movable member so that the movable member will move into engagement with a selected tooth.

7. In a fluid measuring device, a movable measuring cylinder having a head at one end, a piston in the cylinder, a pipe leading to the interior of the cylinder, a valve commanding the pipe, means to actuate the valve, a member pivoted to the means and having a plurality of teeth at different distances from the cylinder when in normal position, the member being adjustable in the path of the cylinder so that the cylinder will move into engagement with a selected tooth, a scale, a pointer movable relatively to the scale, and means by which the pointer is adapted to move the member a distance sufficient to dispose another tooth in the path of the cylinder with the movement of the pointer from one mark to another on the scale.

8. In a fluid measuring device, a movable measuring cylinder, a pipe leading to the interior of the cylinder, a valve commanding the pipe, a link for operating the valve and provided with a cam, means disposed in the path of the cylinder to be moved thereby and having a lug for engaging the cam to hold the valve in predetermined position, resilient means for moving the link when its cam is freed by the lug with the movement of the first means by the cylinder, and resilient means for holding the first mentioned means yieldingly against movement by the cylinder.

9. In a fluid measuring device, a movable measuring cylinder, a piston therein, a pipe leading to the interior of the cylinder, a valve commanding the pipe, a link for operating the valve and provided with a cam, means disposed in the path of the cylinder to be moved thereby and having a lug for engaging the cam to hold the valve in predetermined position, resilient means for moving the link when its cam is freed by the lug with the movement of the first means by the cylinder, a scale, a pointer movable relatively to the scale, and means by which the pointer is adapted to move the first means a distance sufficient to dispose the first means in the path of the cylinder at a greater distance therefrom with a movement of the pointer from one mark to another on the scale.

10. In a fluid measuring device, a movable cylinder having a head, a pipe leading to the cylinder, a valve commanding the pipe, a link connected with the valve for operating the latter, a pivoted arm having a lug, a cam on the link for engagement by the lug to hold the valve in a predetermined position, a member articulated to the arm and disposed in the path of the cylinder to be operated thereby, the member having a slot, means disposed in the slot for operating the member, a spring for holding the pivoted arm yieldingly in normal position, and a spring for moving the link when its cam is disengaged by the lug.

11. In a fluid measuring device, a movable cylinder having a head, a pipe leading to the cylinder, a valve commanding the pipe, a link connected with the valve for operating the latter, a pivoted arm having a lug, a cam on the link for engagement by the lug to hold the valve in a predetermined position, a member articulated to the arm and disposed in the path of the cylinder to be operated thereby, the member having a slot, means disposed in the slot for operating the member, a spring for holding the pivoted arm yieldingly in normal position, a spring for moving the link when its cam is disengaged by the lug, a scale, a pointer movable relatively to the scale, and means by which the pointer is adapted to move the member a distance sufficient to dispose the member in the path of the cylinder at a greater distance from the cylinder with the movement of the pointer from one mark to another on the scale.

12. In a fluid measuring device, a movable measuring cylinder, a pipe leading thereto, a valve commanding the pipe, a lever, means by which the lever is adapted to operate the valve, an operating member, and means mounted on the measuring cylinder and carried thereby for operatively connecting the operating member with the lever when the measuring cylinder is in a predetermined position relatively thereto.

13. In a fluid measuring device, a pipe, a valve commanding the pipe, valve operating means connected with the valve, an operating member, means connecting the operating member with the valve operating means, and means operable by the flow of fluid out of the pipe for moving the second mentioned means out of operative position.

14. In a fluid measuring device, a movable measure, a pipe leading thereto, a valve commanding the pipe, valve operating means connected with the valve, an operating member, means connecting the operating member with the valve operating means, and means mounted on the measure and carried thereby for moving the second mentioned means out of operative position.

15. In a fluid measuring device, a movable measure, a pipe leading thereto, a valve commanding the pipe, valve operating means connected with the valve, an operating member, and means mounted on the movable measure and carried thereby and adapted to connect the operating member and the valve operating means when the measure is in a predetermined position.

16. In a fluid measuring device, a movable measure, a pipe leading thereto, a valve commanding the pipe, valve operating means connected with the valve, resilient means for holding the first means yieldingly in a predetermined position, an operating member, and means mounted on the measure and adapted to connect the operating member and the valve operating means by which the valve operating means may be moved to another position when the measure is in a predetermined position and which disconnects the valve operating means from the operating member when the measure is moved to another position.

17. In a fluid measuring device, a movable measure, a pipe leading thereto, a valve commanding the pipe, valve operating means connected with the valve, resilient means for holding the first means yieldingly in a predetermined position, an operating member, means mounted on the measure and adapted to connect the operating member and the valve operating means, by which the valve operating means may be moved to another position when the measure is in a predetermined position, means to hold the valve operating means in its last named position when moved thereto, and means operable by the movement of the measure to release the fourth mentioned means.

18. In a fluid measuring device, a cylinder, a piston disposed therein, the cylinder being movable relatively to the piston, a pipe having a terminal leading to the interior of the cylinder, a three-way valve having a port connected with the pipe, valve operating means connected with the valve, resilient means for holding the first mentioned means yieldingly in a predetermined position, an operating member, and means mounted on the cylinder and adapted to connect the operating member and the valve operating means, by which the valve operating means may be moved to another position when the measure is in a predetermined position and which disconnects the valve operating means from the operating member when the cylinder is moved to another position.

19. In a fluid measuring device, a movable cylinder, a piston disposed therein, a pipe leading to the interior of the cylinder, a three-way valve having a port connected with the pipe, valve operating means connected with the valve, resilient means for holding the first means yieldingly in a predetermined position, an operating member, and means mounted on the cylinder and adapted to connect the operating member and the valve operating means, by which the valve operating means may be moved to another position when the measure is in a predetermined position and which disconnects the valve operating means from the operating member when the cylinder is moved to another position.

20. In a fluid measuring device, a movable measure, a pipe leading thereto, a valve commanding the pipe, valve operating means connected with the valve, an operating member, and a member movably mounted on the measure and having means for engaging the first means and for engaging by the operating member permitting the operation of the valve operating means by the operating member when the measure is in a predetermined position and which disconnects the valve operating means from the operating member when the measure is moved to another position.

21. In a fluid measuring device, a movable measure, a pipe leading to the interior of the measure, a valve commanding the pipe, valve operating means connected with the valve, resilient means for holding the first means yieldingly in a predetermined position, an operating member, and a member movably mounted on the measure and having means for engaging the first means and for engagement by the operating member permitting the operation of the valve operating means by the operating member when the measure is in a predetermined position.

22. In a fluid measuring device, a movable measure, a pipe leading to the interior of the measure, a valve commanding the pipe, valve operating means connected with the valve, resilient means for holding the first means yieldingly in a predetermined position, an operating member, a member movably mounted on the measure and having means for engaging the first means and for engagement by the operating member permitting the operation of the valve operating means by the operating member when the measure is in a predetermined position, means to hold the valve operating means in the last mentioned position when moved thereto, and means operable by the movement of the measure to release the third mentioned means.

23. In a fluid measuring device, a movable measure, a pipe having a terminal leading thereto, a valve commanding the pipe, valve operating means connected with the valve, a lever operatively connected with the valve operating means, an operating member, a bearing on the measure, and a shaft slidable longitudinally in the bearing and having means for engagement by the operating member and for engaging the lever when the measure is in a predetermined position relatively to the operating member.

24. In a fluid measuring device, a movable measure, a pipe having a terminal leading thereto, a valve commanding the pipe, valve operating means connected with the valve, a lever operatively connected with the valve operating means, an operating member, a bearing on the measure, a shaft journaled in the bearing and movable longitudinally, two projections on the shaft, one for engagement by the operating member and the other for engaging the lever when the measure is in a predetermined position relatively to the operating member.

25. In a fluid measuring device, a movable measure, a pipe having a terminal leading thereto, a valve commanding the pipe, valve operating means connected with the valve, a lever operatively connected with the valve operating means, an operating shaft movable longitudinally and having a projecting lug, means for holding the operating shaft yieldingly in a predetermined position, a bearing on the measure, a shaft journaled in the bearing and movable longitudinally, two projections on the last mentioned shaft, one for engagement by the lug and the other for engaging the lever when the measure is in a predetermined position relatively to the operating member, and resilient means for holding the last mentioned shaft yieldingly in operative position.

26. In a fluid measuring device, a movable measure, a pipe having a terminal leading thereto, a valve commanding the pipe, valve operating means connected with the valve, a lever operatively connected with the valve operating means, an operating shaft movable longitudinally and having a projecting lug, means for holding the operating shaft yieldingly in a predetermined position, a bearing on the measure, a shaft journaled in the bearing and movable longitudinally, two projections on the last mentioned shaft, one for engagement by the lug and the other for engaging the lever when the measure is in a predetermined position relatively to the operating member, resilient means for holding the last mentioned shaft yieldingly in operative position, and resilient means for holding the valve operating means with the lever in operative position.

27. In a fluid measuring device, a movable measure, a pipe having a terminal leading thereto, a valve commanding the pipe, valve operating means connected with the valve, a lever operatively connected with the valve operating means, an operating shaft movable longitudinally and having a projecting lug, means for holding the operating shaft yieldingly in a predetermined position, a bearing on the measure, a shaft journaled in the bearing and movable longitudinally, two projections on the last mentioned shaft, one for engagement by the lug and the other for engaging the lever when the measure is in a predetermined position relatively to the operating member, resilient means for holding the last mentioned shaft yieldingly in operative position, resilient means for holding the valve operating means with the lever in operative position, and means freed by the measure when the measure reaches a predetermined position, for holding the valve operating means against movement by its resilient means.

28. In a fluid measuring device, a movable measuring member, a pipe leading thereto, a valve commanding the pipe, a member adapted to be moved into the path of the measuring member for engagement by the latter, an operating member, a valve operating means connected with the valve, a lever articulated to the valve operating means, means on the measuring member for operatively connecting the operating member with the lever when the measuring member is in a predetermined position, and means on the second mentioned member for holding the valve operating means in predetermined position until the second mentioned member is engaged by the measuring member.

29. In a fluid measuring device, a movable measuring member, a pipe leading thereto, a valve commanding the pipe, a member adapted to be moved into the path of the measuring member for engagement by the latter, an operating member, a valve operating means connected with the valve, a lever articulated to the valve operating means, means on the measuring member for operatively connecting the operating member with the lever when the measuring member is in a predetermined position, means on the second mentioned member for holding the valve operating means in predetermined position until the second mentioned member is engaged by the measuring member, and resilient means for moving the valve operating means when it is freed by the means on the second mentioned member.

30. In a fluid measuring device, a movable measuring member, a pipe leading thereto, a valve commanding the pipe, a member adapted to be moved to any one of a plurality of positions to be engaged by the measuring member when the measuring member reaches any one of a plurality of positions, an operating member, a valve operating means, a lever articulated to the valve operating means, means on the measuring member for operatively connecting the operating member with the lever when the measuring member is in a predetermined position, means on the second mentioned member for holding the valve operating means in predetermined position until the second mentioned member is engaged by the measuring member, resilient means for moving the valve operating means when it is freed by the means on the second mentioned member, a shaft, a pointer secured to the shaft, a scale in the path of the pointer, and means connecting the shaft with the second mentioned member to dispose the second mentioned member in position to permit the movement of the measuring member a distance before striking the second mentioned member which is at a fixed ratio relatively to the movement of the pointer.

31. In a fluid measuring device, a movable measuring member, a pipe leading thereto, a valve commanding the pipe, a member adapted to be moved into the path of the measuring member for engagement by the latter, an operating member, a valve operating means connected with the valve, a lever articulated to the valve operating means, means on the measuring member for operatively connecting the operating member with the lever when the measuring member is in a predetermined position, means on the second mentioned member for holding the valve operating means in predetermined position until the second mentioned member is engaged by the measuring member, a shaft, a slot in the second mentioned member eccentric with the shaft, an arm secured to the shaft and having a member disposed in the slot, and a pointer secured to the shaft.

32. In a fluid measuring device, a movable measuring member, a pipe leading thereto, a valve commanding the pipe, a second member having teeth for engagement by the measuring member, the tooth which is disposed in the path of the measuring member being determined by the relative movement of the second mentioned member, an operating member, a valve operating means, a lever articulated to the valve operating means, means on the measuring member for operatively connecting the operating member with the lever when the measuring member is in a predetermined position, and means on the second mentioned member for holding the valve operating means in a predetermined position until the second mentioned member is engaged by the measuring member.

33. In a fluid measuring device, a measuring cylinder having a head at its bottom, a piston disposed in the measuring cylinder, a pipe leading to the interior of the measuring cylinder, a valve commanding the pipe, valve operating means connected with the valve, a counterweight, means connecting the counterweight with the measuring cylinder, and locking means for the counterweight operable by a movement of the valve operating means.

34. In a fluid measuring device, a measuring cylinder having a head at its bottom, a piston disposed in the measuring cylinder, a pipe leading to the interior of the measuring cylinder, a valve commanding the pipe, valve operating means connected with the valve, a counterweight, means connecting the counterweight with the measuring cylinder, means for securing the counterweight in inoperative position, a shaft to which the last mentioned means is secured, a lever having means for rotating the shaft, and a lug on the valve operating means for operating the lever.

35. In a fluid measuring device, a measuring cylinder having a head at its bottom, a piston disposed in the measuring cylinder, a pipe leading to the interior of the measuring cylinder, a valve commanding the pipe, valve operating means connected with the valve, a counterweight, means connecting the counterweight with the measuring cylinder, means for securing the counterweight in inoperative position, a shaft to which the last mentioned means is secured, a lever having means for rotating the shaft, a lug on the valve operating means for operating the lever, a spring having a stop for engaging the lever to hold the latter when the lug on the valve operating means has been moved out of operative position, the spring being disposed in the path of the counterweight to be moved thereby to free the lever when the counterweight is moved to primary position, and resilient means for moving the lever to primary position when freed by the stop on the spring.

36. In a fluid measuring device, a measuring cylinder having a head at its bottom, a piston disposed therein, a siphon having its short leg leading to the interior of the cylinder, a three-way valve having a port connected with the long leg of the siphon, and means operable by the movement of the measuring cylinder for actuating the valve.

37. In a fluid measuring device, a measuring cylinder, a siphon having a short leg leading to the cylinder, a three-way valve having a port to which is connected the long leg of the siphon, an operating member, valve operating means, means on the cylinder for connecting the operating member with the valve operating means when the cylinder is in a predetermined position, means for holding the valve operating means yieldingly in a predetermined position, and means freed by engagement with the measuring cylinder for holding the valve operating means in another position when moved thereto by the operating member.

38. In a fluid measuring device, a measuring cylinder having a head at its bottom, a piston in the cylinder, the cylinder being movable relatively to the piston, a three-way valve, a pipe in the shape of a siphon and having a short leg connected with the interior of the cylinder, the long leg of the siphon being connected with the three-way valve at one of its ports, and means for operating the valve when a predetermined quantity of fluid is disposed in the measuring cylinder.

39. In a fluid measuring device, a movable measuring cylinder having a head at its bottom, a pipe leading to the interior of the cylinder, a valve commanding the pipe, means to actuate the valve, a member pivoted to the means and having a plurality of teeth at different distances from the cylinder when in normal position, the member being adjustable in the path of the cylinder so that the cylinder will move into engagement with a selected tooth.

40. In a fluid measuring device, a movable cylinder having a head at its bottom, a pipe leading to the cylinder, a valve commanding the pipe, means to actuate the valve, a member pivoted to the means and having a plurality of teeth at different distances from the cylinder when in normal position, the member being adjustable in the path of the cylinder so that the cylinder will move into engagement with a selected tooth, a scale, a pointer movable relatively to the scale, and means by which the pointer is adapted to move the member a distance sufficient to dispose another tooth in the path of the cylinder with the movement of the pointer from one mark to the other on the scale.

41. In a fluid measuring device, a cylindrical member, a piston member disposed therein, one of the members being movable relatively to the other, a valve, a siphon connecting the valve with the cylindrical member, and means for operating the valve when the movable member reaches a predetermined position.

42. In a fluid measuring device, a movable measuring cylinder, a pipe leading to the cylinder, a valve commanding the pipe, means adjustably disposed for engagement by the cylinder for operating the valve, a scale, a pointer movable relatively to the scale, and means by which the pointer is adapted to move the first mentioned means a distance sufficient to dispose the first mentioned means in the path of the cylinder at a greater distance therefrom with a movement of the pointer from one mark to the other on the scale.

SIDNEY FITZHUGH MIOTON.